Aug. 6, 1935.  F. D. HANSEN ET AL  2,010,080

METAL COVER FOR AUTOMOBILE TIRES

Original Filed July 18, 1930  2 Sheets-Sheet 1

Inventors
Frederick D. Hansen
and Herbert W. Tinker
by Rector, Hibben, Davis and Macauley Attys.

Aug. 6, 1935.  F. D. HANSEN ET AL  2,010,080
METAL COVER FOR AUTOMOBILE TIRES
Original Filed July 18, 1930  2 Sheets-Sheet 2
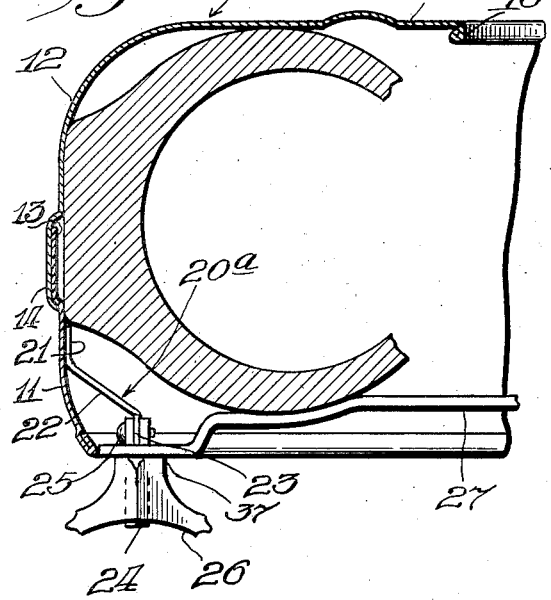
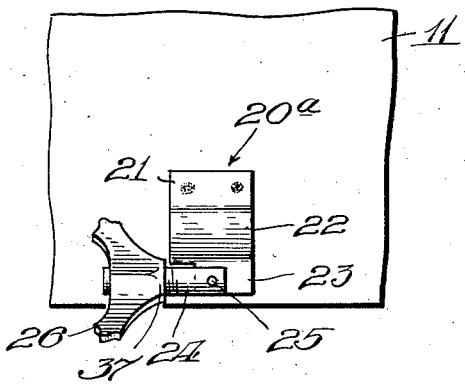
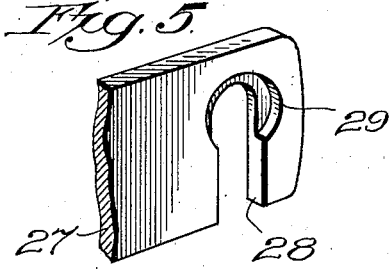
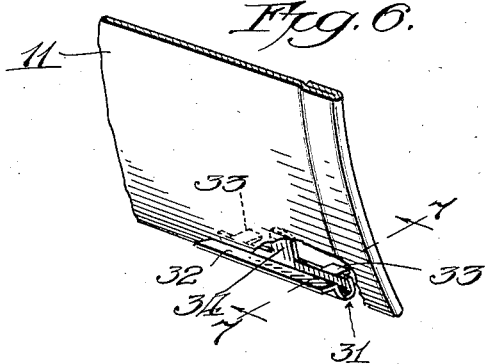
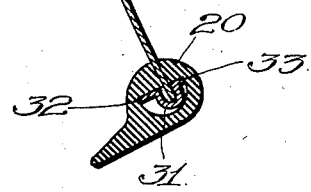
Inventors
Frederick D. Hansen
and Herbert W. Tinker
By Rector, Hibben, Davis and Macauley
Attys Patented Aug. 6, 1935

2,010,080

UNITED STATES PATENT OFFICE 2,010,080

METAL COVER FOR AUTOMOBILE TIRES

Frederick D. Hansen and Herbert W. Tinker, Milwaukee, Wis., assignors, by mesne assignments, to Lyon Incorporated, Detroit, Mich., a corporation of Delaware Application July 18, 1930, Serial No. 468,887
Renewed February 1, 1934

21 Claims. (Cl. 150—54)

Our invention relates to metal covers for automobile tires and more particularly to improved means for securing the cover to the tire.

The principal object of our invention is to provide a novel device for firmly securing a metal cover to the tire, the device being constructed so that the cover may be easily applied to and removed from the tire, while at the same time the device is substantially concealed from view. A further object of the invention is to permit movement of parts of the device to facilitate shipping and handling of the cover.

The above and other objects of our invention will be set forth in the following specification, reference being had to the accompanying drawings, and the novel means by which said objects are effectuated will be definitely pointed out in the claims.

In the drawings:

Fig. 3 is a section along the line 3—3 of Fig. 2.

Fig. 4 is a fragmentary view showing one of the brackets and clamps in side elevation.

Fig. 5 is a detail rear view of one end of the securing bar.

Fig. 6 is a fragmentary perspective view of one corner of the cover and one of the clips for holding the cushion strip; and Fig. 7 is a section taken on the line 7—7 of Fig. 6.

Figure 1:
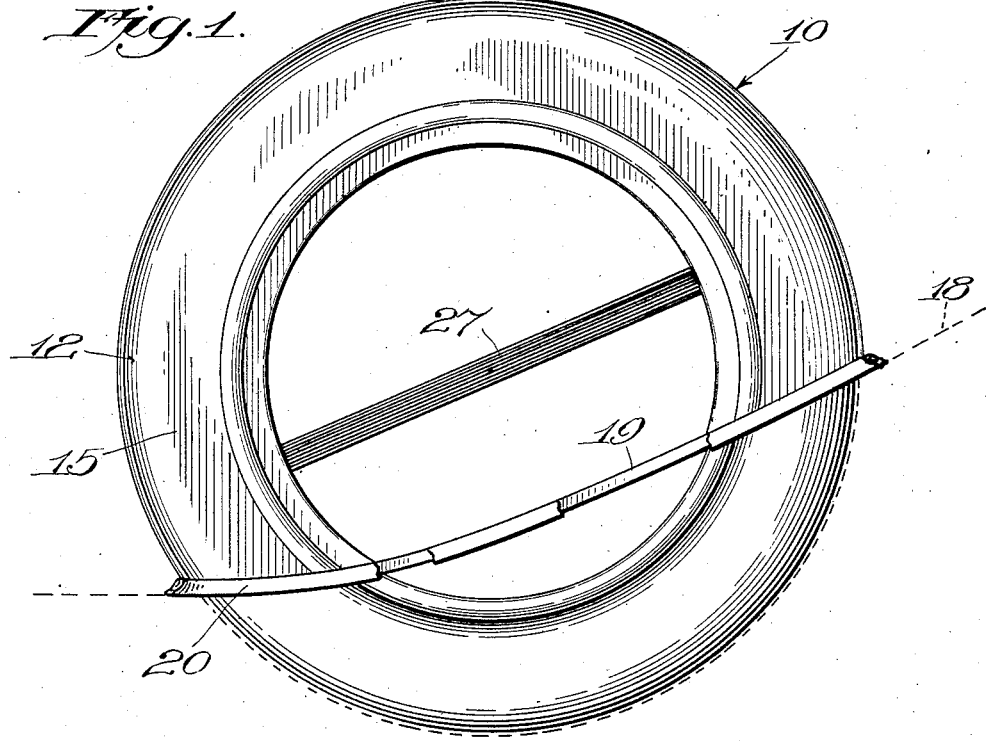
Figures 1 and 2 are front and rear elevations, respectively of the tire cover which is shown applied to the tire in Fig. 1.

The numeral 10 designates the tire cover which is preferably formed of metal and composed of two parts 11 and 12, see Fig. 3, appropriately shaped and permanently united by spot welds or other means along their overlapping ridges 13 and 14. The part 11 and the curved portion of part 12 are formed circumferentially and transversely to the required curvatures. The part 12 of the cover also forms an annular shield 15 which extends inwardly and is curled along the inner edge thereof, as at 16, to present a finished appearance.

Figure 2:
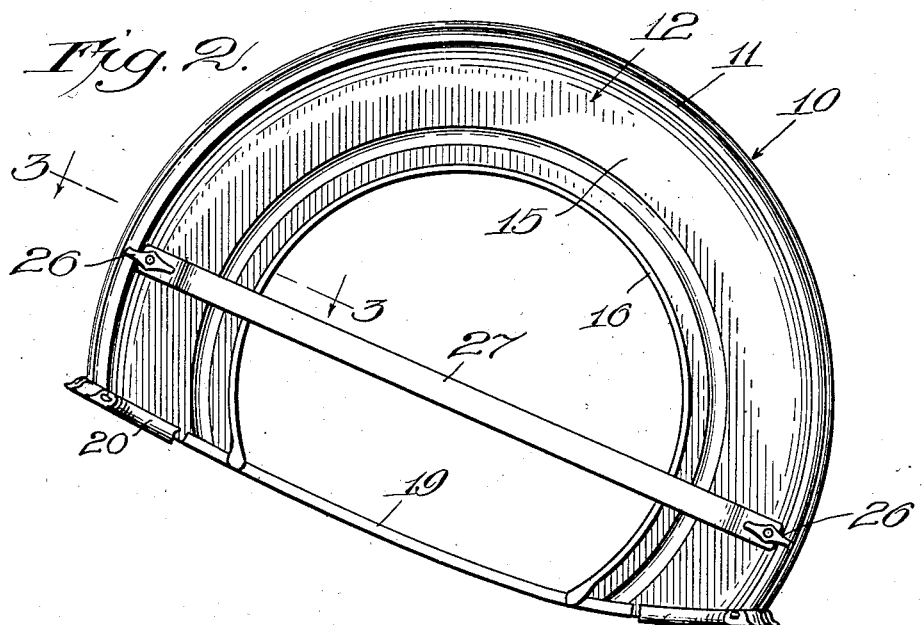

The general profile of the cover, as shown in Figs. 1 and 2, is generally parti-circular, the lower edge of the cover being shaped to conform to the fender of a vehicle. The fender is indicated diagrammatically by the dotted line 18 in Fig. 1. It may be provided with the usual well to accommodate the lower part of the tire.

In order to suitably strengthen the lower portion of the cover along the bottom edge, but at the same time to permit of a slight yielding movement, a reenforcing member 19, preferably in the form of a flat metal strip, is welded to the shield. A rubber cushion strip 20 encloses the lower edge throughout the length thereof. The strip 20 is shown broken away in Figs. 1 and 2 and in cross section in Fig. 7.

On the inside of the cover and diametrically opposite each other are two brackets 20ᵃ (Figs. 3 and 4) having flat portions 21 spot welded or otherwise secured to the cover. The intermediate portions 22 of the brackets are inclined inwardly and rearwardly while the rear portions 23 of the brackets extend rearwardly and are reduced in height as best shown in Fig. 4. Pivoted to the portions 23 are headless bolts 24 having their attached ends split and straddling the portions 23 to which they are pivoted by rivets or screws 25. Wing nuts 26 having round bosses or shanks 37 are threaded on the bolts 24.

A bar 27, bent adjacent its opposite ends as best shown in Fig. 3, is provided at its ends with slots 28 (Fig. 5) which are open at their lower ends. Circular recesses or depressions 29 are formed around the upper ends of the slots on the rear side of the bar.

In order to hold the cushion strip 20 in position on the lower edge of the cover, I provide spaced clips 31 (Figs. 6 and 7) secured to the lower edge of the cover. Each clip is formed to provide an outwardly projecting flange 32, two inwardly extending lips 33 and an upwardly projecting tongue 34, spot welded to the cover. As shown in Fig. 7 the cushion strip is formed to engage over the lips 33 and flange 32 to hold it in place.

In applying a tire cover to a tire, it will be apparent that the same may be bodily moved into position on the tire. The covering having been so placed in position, the bar 27 is mounted on the bolts 24 which receive the slots 28. The distance between the bolts, before the bar is applied is slightly greater than the distance between the slots 28 so the sides of the cover are flexed towards each other when the bar is mounted on the bolts thus drawing the cover againsts the opposite sides of the tire tread to afford a snug fit and eliminate radial movement of the cover relative to the tire. The wing nuts 26 are then tightened with the result that the shield 15 is drawn firmly against the front side of the tire and the bar 27 is pressed firmly against the rear side of the tire to prevent any axial movement of the cover relative to the tire. The round bosses 37 on the wing nuts fit in the recesses 29 in the bar to lock the bar in position. By this improved fastening device the cover is fastened to the tire and all play, with resultant rattle or noise, is eliminated while at the same time the device is concealed by the cover thus enhancing the general appearance of the cover. Further the device is simple in construction, cheap to manufacture, and easily handled and shipped.

We claim:

1. In a metal tire cover having a parti-circular, circumferential portion adapted to fit over the tread of a tire and a shield portion adapted to cover the front of the tire, a cross bar, and opposed clamping devices mounted on the inside of said circumferential portion, said cross bar having means normally spaced apart a lesser distance than said clamping devices and engageable with the latter to hold the shield portion against the front of the tire and the bar against the rear of the tire.

2. A metal tire cover having a single unit comprising a parti-circular, circumferential portion and a shield portion adapted to fit, respectively, over the tread and front of a tire, rigid clamping means mounted on the inside of said circumferential portion, and rigid means engageable with said clamping means by raidial contraction of said circumferential portion and operated by said clamping means to engage the rear side of the tire and cause said shield to engage the front side of the tire.

3. A unitary tire cover having a front portion and a parti-circular, circumferential portion conforming substantially to the circumferential and transverse curvatures of the tire and extending around the tire more than 180° and adapted to fit over the tread of the tire, said circumferential portion having flexible sides, a cross bar spanning said cover intermediate its top and bottom, and clamping devices carried by said flexible sides and adapted to be engaged by said cross bar to flex and hold the sides of said circumferential portion in flexed condition against the tire tread on opposite sides.

4. A metal tire cover shaped generally to the degrees of circumferential and transverse tread curvatures of a tire and having a parti-circular tread portion with flexible tread sides, a cross bar, and opposed clamping devices on the inside of said tread portion, said cross bar being adapted to engage said clamping devices and flex the sides of said cover against the tire tread on opposite sides.

5. In a metal tire cover having a circumferential portion adapted to fit over the tread of a tire and a shield portion adapted to cover the front of the tire, concealed brackets mounted on the inside of said circumferential portion, clamping bolts pivoted on said brackets, and a cross bar mounted on said bolts and operated thereby to cause the bar to firmly engage the rear side of the tire and the shield portion to engage the front side of the tire.

6. In a metal tire cover having a circumferential portion adapted to fit over the tread of a tire and a shield portion adapted to cover the front of the tire, concealed brackets mounted on the inside of said circumferential portion, threaded members mounted on said brackets, manipulative nuts on said threaded members, and a cross bar having slots fitting over said threaded members and having depressions in which said nuts engage.

7. A metal tire cover having a unitary circumferential portion adapted to fit over the tread of a tire and a shield portion adapted to cover the front of the tire, said circumferential portion being parti-circular defining an edge conforming to the shape of the fender of an automobile, a cross bar, and clamping devices therefor supported by said circumferential portion, the cross bar being adapted to engage the rear side of the tire and said clamping devices to draw the shield portion against the front of the tire and to hold the sides of said circumferential portion flexed inwardly against the tread of the tire.

8. A metal tire cover having a unitary, circumferential portion adapted to fit over the tread of a tire and a shield portion adapted to cover the front of the tire, said cover having a parti-circular profile in front elevation defining an edge conforming to the shape of the fender of an automobile, a cross bar, and opposed clamping devices therefor mounted on the inside of said circumferential portion, said cross bar being adapted to engage the rear side of the tire and having means normally spaced apart a less distance than said clamp devices to engage the latter to draw the shield portion against the front of the tire and to hold the sides of said circumferential portion flexed inwardly against the tread of the tire.

9. A metal tire cover having a circumferential portion adapted to fit over the tread of a tire and a shield portion adapted to cover the front of the tire, said cover having a parti-circular profile in front elevation defining an edge conforming to the shape of the fender of an automobile, spaced metal clips secured to said edge having oppositely extending projections, and a cushion strip having a groove fitting over said edge and held in such position by said clips.

10. A unitary metal tire cover having a body shaped generally to the transverse and circumferential curvatures of the tire and of such size relationship thereto that it may be readily mounted upon and removed from the tire without disturbing the latter, said body including a flexible tread portion less than 360° and more than 180° in extent, adjustable means carried by said tread portion, and a member detachably engaged with said adjustable means at the rear of the tire for holding the cover pressed radially and axially toward and upon the tire to hold the cover in tire-covering position.

11. In a metal tire cover having a parti-circular circumferential portion for fitting over the tread of a spare tire, and a shield portion adapted to cover the front of the tire, a cross bar, and opposed clamping devices mounted on said circumferential portion, said cross bar having means normally spaced apart less than said clamping devices and engageable with the latter to hold the shield portion against the front of the tire and the bar against the rear of the tire.

12. A tire cover having a unitary, circumferential portion for fitting over the tread of a tire, and a shield portion for covering the front of the tire, said cover having a parti-circular profile in front elevation defining an edge conforming to the shape of the fender of an automobile, a cross bar engageable with the rear of the tire, and opposed supporting devices therefor mounted on the circumferential portion so as to yield in a generally radial direction, said bar having means normally spaced apart less than said devices and engageable with the latter upon yielding of the devices to draw the circumferential portion toward the tire tread.

13. A tire cover having a unitary, circumferential portion for fitting over the tread of a tire, and a shield portion for covering the front of the tire, said cover having a parti-circular profile in front elevation defining an edge conforming to the shape of the fender of an automobile, a cross bar engageable with the rear of the tire, opposed supporting devices therefor mounted on the circumferential portion so as to yield in a generally radial direction, said bar having means normally spaced apart less than said devices and engageable with the latter upon yielding of the devices to draw the circumferential portion toward the tire tread, and means for securing the bar to the supporting devices against accidental separation therefrom.

14. A tire cover having a unitary, circumferential portion for fitting over the tread of a tire, and a shield portion for covering the front of the tire, said cover having a parti-circular profile in front elevation defining an edge conforming to the shape of the fender of an automobile, a cross bar engageable with the rear of the tire, opposed supporting devices therefor mounted on the circumferential portion so as to yield in a generally radial direction, said bar having means normally spaced apart less than said devices and engageable with the latter upon yielding of the devices to draw the circumferential portion toward the tire tread, and means for pressing said bar against the tire to thereby hold the cover in proper tire covering position.

15. A tire cover having a unitary, circumferential portion for fitting over the tread of a tire, and a shield portion for covering the front of the tire, said cover having a parti-circular profile in front elevation defining an edge conforming to the shape of the fender of an automobile, a cross bar engageable with the rear of the tire, opposed supporting devices therefor mounted on the circumferential portion, said circumferential portion being resilient and yieldable in a generally radial direction, said bar having means normally spaced apart less than said devices and engageable with the latter upon yielding of said circumferential portion to draw the circumferential portion toward the tire tread.

16. A unitary tire cover having a body shaped generally to the transverse and circumferential curvatures of the tire and of such size relationship thereto that it may be readily mounted upon and removed from the tire without disturbing the latter, said body including a resilient tread covering portion, connecting means carried by said body and engaging said tread covering portion, and a member movably engaged with said connecting means at the rear of the tire and arranged to hold said tread covering portion flexed in a generally radial direction and press said body axially toward and upon the tire to hold the cover in tire-covering position and to be moved so as to permit removal of the body from the tire.

17. In a cover for application to a spare tire carried in a fender well, a flexible arcuate body of substantially form-retaining sheet material shaped generally to the transverse and circumferential surfaces of the tire for protecting tread and side portions of the tire and having spaced ends and being of such size relationship thereto that the body may be readily mounted upon and removed from the tire without disturbing the latter, and relatively rigid means bridging spaced portions of said body so as to rigidify the body and hold the same in proper tire protecting position.

18. In a cover for application to a spare tire carried in a fender well, a flexible arcuate body of substantially form-retaining sheet material shaped generally to the transverse and circumferential surfaces of the tire for protecting tread and side portions of the tire and having spaced ends and being of such size relationship thereto that the body may be readily mounted upon and removed from the tire without disturbing the latter, and relatively rigid means bridging substantially diametrically opposite portions of said body so as to rigidify the body and hold the same in proper tire protecting position.

19. In a tire cover for application to a spare tire carried in a fender well, a part-circular tread covering portion formed to extend over a side of the tire tread and having spaced ends for co-operation with the fender well in the enclosure of the tire, and means for bridging the gap between said ends and comprising a transversely extending bar between said ends and connected thereto for resisting distortion and preventing disalinement of said ends.

20. In a tire cover for application to a spare tire carried in a fender well, a part-circular tread covering portion formed to extend over a side of the tire tread and having spaced ends shaped to conform to the fender adjacent the well thereof for co-operation with the fender well in the enclosure of the tire, and means for bridging the gap between said ends and comprising a transversely extending bar between said ends and connected thereto for resisting distortion and preventing disalinement of said ends.

21. In a cover for application to a spare tire carried in a fender well, an arcuate part-circular sheet material cover member having rim and side portions for the tread and side wall portions of the tire, and a relatively rigid reinforcing strip secured to and bridging the gap between the ends of the side portion of the cover member so as to resist distortion and prevent disalinement of the ends of the cover member.

FREDERICK D. HANSEN.
HERBERT W. TINKER.